(12) United States Patent
Larsson et al.

(10) Patent No.: US 9,695,960 B2
(45) Date of Patent: Jul. 4, 2017

(54) FUEL DISPENSING UNIT COMPRISING A LOCKING MEMBER FOR RETAINING A FUEL CONDUIT IN A LOCKED POSITION

(75) Inventors: Bengt Ingemar Larsson, Tingarod (SE); Mattias Goran Mårtensson, Kavlinge (SE)

(73) Assignee: Wayne Fueling Systems Sweden AB, Malmo (SE)

( * ) Notice: Subject to any disclaimer, the term of this patent is extended or adjusted under 35 U.S.C. 154(b) by 640 days.

(21) Appl. No.: 13/811,851

(22) PCT Filed: Jul. 9, 2010

(86) PCT No.: PCT/EP2010/059940
§ 371 (c)(1),
(2), (4) Date: Jun. 17, 2013

(87) PCT Pub. No.: WO2012/003889
PCT Pub. Date: Jan. 12, 2012

(65) Prior Publication Data
US 2013/0284300 A1    Oct. 31, 2013

(51) Int. Cl.
| | | |
|---|---|---|
| B67D 7/40 | (2010.01) |
| F16L 3/08 | (2006.01) |
| F16L 5/00 | (2006.01) |
| F16L 37/098 | (2006.01) |
| F16L 3/00 | (2006.01) |
| F16L 41/00 | (2006.01) |

(52) U.S. Cl.
CPC .............. *F16L 3/08* (2013.01); *B67D 7/40* (2013.01); *F16L 3/00* (2013.01); *F16L 5/00* (2013.01); *F16L 37/0985* (2013.01); *F16L 41/00* (2013.01); *Y10T 403/60* (2015.01)

(58) Field of Classification Search
CPC ...... F16L 3/08; F16L 3/00; F16L 41/00; F16L 37/0985; F16L 5/00; Y10T 403/45; Y10T 403/4628; Y10T 403/4694; Y10T 403/54; Y10T 403/587; Y10T 403/60
USPC ............... 403/220, 240, 263, 291, 319, 326
See application file for complete search history.

(56) References Cited

U.S. PATENT DOCUMENTS 4,842,309 A  *  6/1989  LaVene et al. ............... 285/319
5,154,450 A  *  10/1992  Washizu ...................... 285/319
6,082,943 A  *  7/2000  Schneider ............... F16B 21/18
                                                                411/353

(Continued)

FOREIGN PATENT DOCUMENTS

EP    0 547 487 A1    6/1993

OTHER PUBLICATIONS

PCT International Preliminary Report on Patentability; International Application No. PCT/EP2010/059940; International Filing Date: Jul. 9, 2010; 17 pages.

*Primary Examiner* — Josh Skroupa
(74) *Attorney, Agent, or Firm* — Mintz Levin Cohn Ferris Glovsky and Popeo, P.C.

(57) ABSTRACT

A fuel dispensing unit is provided that includes a fuel conduit including an external annular bead and a locking member including inwardly extending resilient tongues. The locking member is configured to retain the fuel conduit in a locked position and to receive the fuel conduit in an open position. The external annular bead of the fuel conduit causes the locking member to move to the open position when the locking member receives the fuel conduit.

10 Claims, 7 Drawing Sheets

(56) References Cited

U.S. PATENT DOCUMENTS 7,611,171 B2 * 11/2009 Yoshino .............. F16L 37/0985
285/1

* cited by examiner

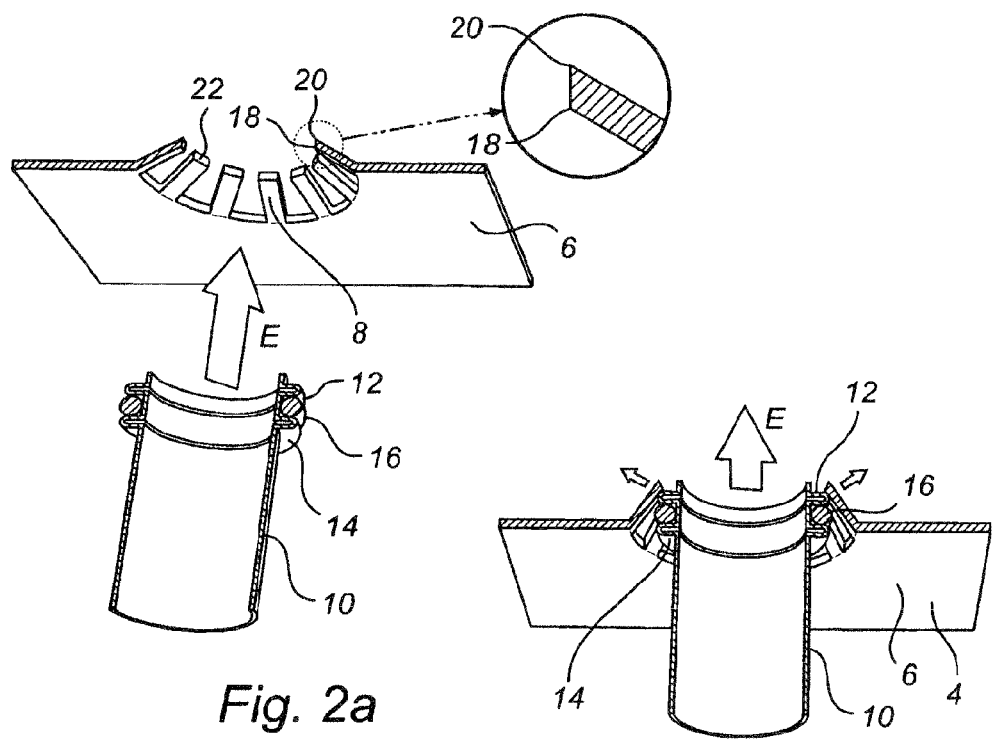
Fig. 2a
Fig. 2b
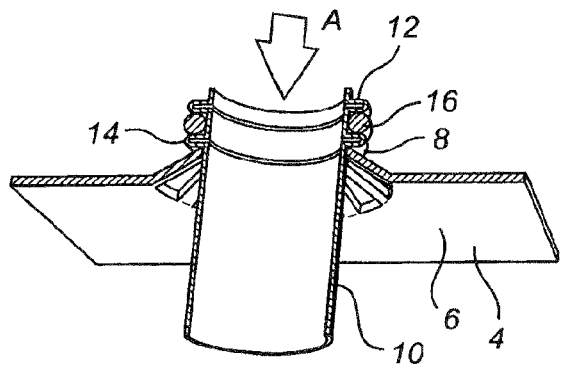
Fig. 2c

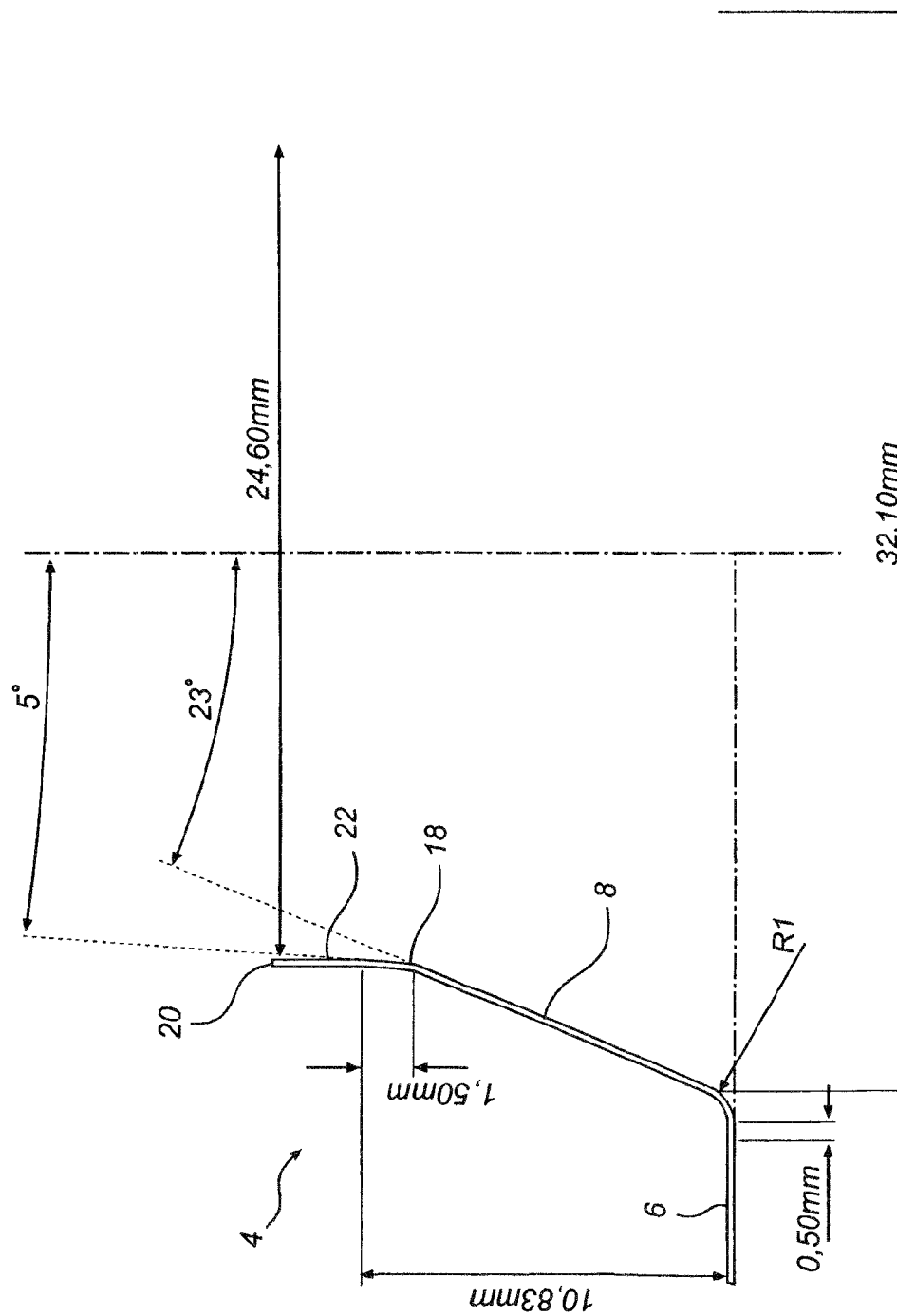

FUEL DISPENSING UNIT COMPRISING A LOCKING MEMBER FOR RETAINING A FUEL CONDUIT IN A LOCKED POSITION

TECHNICAL FIELD OF THE INVENTION

The present invention relates to a fuel dispensing unit comprising a fuel conduit and a locking member for retaining the fuel conduit in a locked position.

BACKGROUND OF THE INVENTION

An important part of fuel dispensing units is a fuel conduit for conducting the fuel. Furthermore, it is very important to make sure that all fuel conduits are securely retained in the fuel dispensing unit, this in order to avoid leakage, e.g. due to that two fuel conduits being connected to each other being drawn apart.

Many methods are known for securely retaining a fuel conduit in a fuel dispensing unit. One method aims at welding the fuel conduit to a frame of the fuel dispensing unit. In another method the fuel conduits are attached to the frame of the fuel dispensing unit by bolts or screws. These methods aim at fixedly retaining the fuel conduits in the fuel dispenser unit. A drawback is that it is time consuming to mount the fuel conduits in the fuel dispensing unit. Another obvious drawback is that it is difficult and time consuming to service and especially new assembly the fuel dispensing unit, e.g. exchange an old fuel conduit.

In a further method a fuel conduit is retained in the fuel dispending unit by a clamp anchor, the fuel conduit is pulled through an opening and then a clamp anchor is applied to the fuel conduit in order to make it impossible to withdraw the fuel conduit back through the opening. A drawback of this method is that it is time consuming to mount the conduit in the fuel dispensing unit.

Accordingly, there is a need for improvements on how to retain a fuel conduit in a fuel dispensing unit.

SUMMARY OF THE INVENTION

One object of the present invention is to facilitate an improved fuel dispensing unit comprising a fuel conduit, wherein the fuel conduit is securely retained.

The above object is achieved by a fuel dispensing unit according to the independent claims. Further embodiments of the invention are presented in the dependent claims.

According to a first aspect of the invention a fuel dispensing unit is provided. The fuel dispensing unit comprises a fuel conduit and a locking member. The fuel conduit comprises an external annular bead. The locking member comprises inwardly extending resilient tongues. The locking member is arranged to retain the fuel conduit in a locked position and receive the fuel conduit in an open position. The external annular bead of the fuel conduit is arranged to put the locking member in the open position when receiving said fuel conduit. Each tongue comprises an obtuse edge and an acute edge at the end portion thereof. The locking member is arranged such that only the obtuse edge of each tongue engages the fuel conduit in the open position.

This is advantageous in that the fuel conduit can be securely retained in the fuel dispensing unit in a simple and non-time-consuming manner. The fuel conduit is just guided through the locking member and is thereafter retained in the locked position of the locking member. The tongues of the locking member, more precise the acute edge at the end portion of each tongue, prevent the fuel conduit to be withdrawn. Moreover, this is advantageous in that it is only the obtuse edge of each tongue that engage the fuel conduit in the open position, wherein the risk of the tongues causing any damage to the external annular bead is minimized.

The angle of the obtuse edge may e.g. be 90°, 100°, 110° or 120° but it is preferably 130° or greater. A greater angle of the obtuse edge makes the edge blunter. A blunt edge is less harmful against the external annular bead.

According to a second aspect of the invention a fuel dispensing unit is provided. The fuel dispensing unit comprises a fuel conduit and a locking member. The fuel conduit comprises an external annular bead. The locking member comprises inwardly extending resilient tongues. The locking member is arranged to retain the fuel conduit in a locked position and receive the fuel conduit in an open position. The external annular bead of the fuel conduit is arranged to put the locking member in the open position when receiving said fuel conduit. Each tongue comprises an edgeless end portion.

Again this is advantageous in that the fuel conduit can be securely retained in the fuel dispensing unit in a simple and non-time-consuming manner. The fuel conduit is just guided through the locking member and is thereafter retained in the locked position of the locking member. The tongues of the locking member prevent the fuel conduit to be withdrawn. Moreover, this is advantageous in that the edgeless end portion of the tongues minimizes the risk of the tongues to cause any damage to the external annular bead when the fuel conduit is guided through the locking member.

The fuel conduit may comprise an external O-ring, wherein the external annular bead and the O-ring are arranged to put the locking member in the open position when receiving said fuel conduit.

The fuel conduit may comprise a second external annular bead, wherein the O-ring is accommodated between the two external annular beads, and wherein the two external annular beads and the O-ring are arranged to put the locking member in the open position when receiving said fuel conduit.

According to a third aspect of the invention a fuel dispensing unit is provided. The fuel dispensing unit comprises a fuel conduit and a locking member. The fuel conduit comprises an external annular bead. The locking member comprises inwardly extending resilient tongues. The locking member is arranged to retain the fuel conduit in a locked position and receive the fuel conduit in an open position. The external annular bead of the fuel conduit is arranged to put the locking member in the open position when receiving said fuel conduit. The end portion of each tongue is formed by a material having a degree of hardness being less than the degree of hardness of the external annular bead.

Again this is advantageous in that the fuel conduit can be securely retained in the fuel dispensing unit in a simple and non-time-consuming manner. The fuel conduit is just guided through the locking member and is thereafter retained in the locked position of the locking member. The tongues of the locking member prevent the fuel conduit to be withdrawn. Moreover, this is advantageous in that the end portion of the tongues are made in material having a degree of hardness being less than the degree of hardness of the external annular bead. By forming the tongues according to this the risk of the tongues to cause any damage to the external annular bead when the fuel conduit is guided through the locking member is minimized.

The fuel conduit may comprise an external O-ring, wherein the external annular bead and the O-ring are arranged to put the locking member in the open position when receiving said fuel conduit, and wherein the end portion of each tongue is formed by a material having a degree of hardness being less than the degree of hardness of the O-ring.

The fuel conduit may comprise a second external annular bead, wherein the O-ring is accommodated between the two external annular beads, and wherein the two external annular beads and the O-ring are arranged to put the locking member in the open position when receiving said fuel conduit, and wherein the end portion of each tongue is formed by a material having a degree of hardness being less than the degree of hardness of the O-ring.

The number of tongues may be two or more. Excellent latching capability is provided by an even number of tongues arranged in opposed pairs. The rigidity of the locked position depends on the amount of tongues, more tongues makes the locked position more rigid. The number of tongues is preferably eight or more.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements.

FIG. 2a is a sectional view of a locking member according to a first embodiment of the present invention.

FIG. 2b is a sectional view of a locking member according to the first embodiment wherein the external annular bead and the O-ring of the fuel conduit is putting the locking member in an open position for receiving said fuel conduit.

FIG. 2c is a sectional view of a locking member according to the first embodiment into which a fuel conduit has been retained.

FIG. 7 is a sectional view of the locking member according to the forth embodiment of the present invention

DETAILED DESCRIPTION OF PREFERRED EMBODIMENTS

Figure 1:
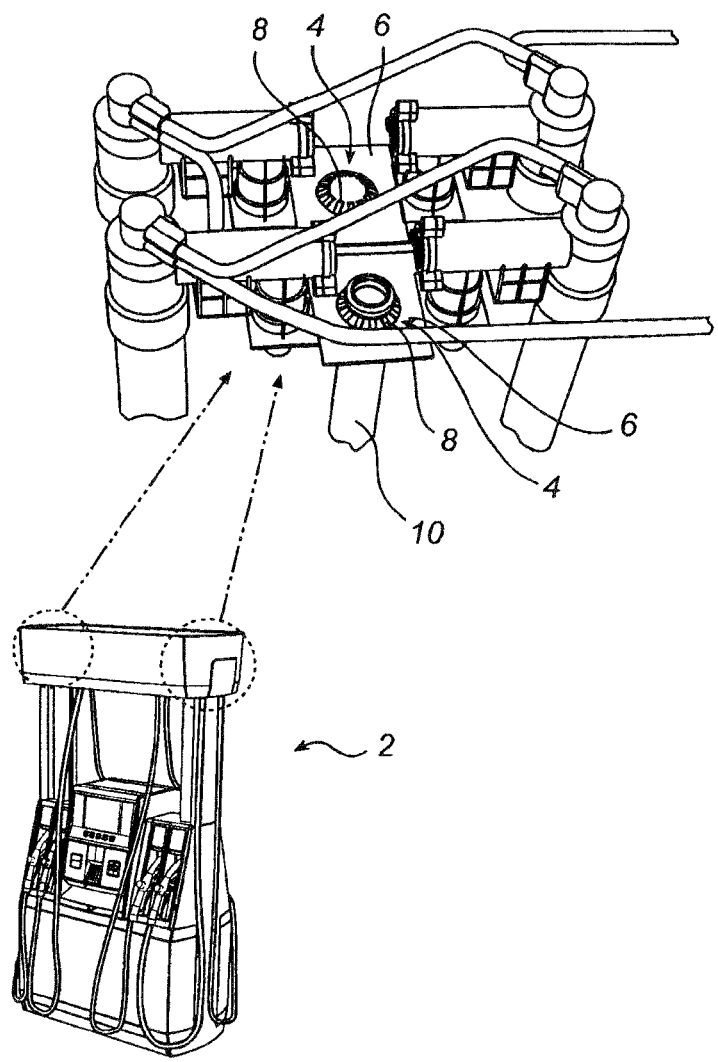
FIG. 1 is a perspective view of a fuel dispenser comprising two locking members for retaining fuel conduits and wherein a fuel conduit is inserted into one of the locking members.

FIG. 1 illustrates a fuel dispensing unit 2 according to the invention comprising two locking members 4. Each locking member 4 comprises a main body 6 and inwardly extending resilient tongues 8. A fuel conduit 10 is inserted into one of the locking members 4. The tongues 8 are used to retain a fuel conduit 10 of the fuel dispensing unit 2 in a locked position. The tongues 8 are circumferentially spaced. Each tongue 8 is bent into an angular, inwardly extending position. In a resting position, i.e. the position shown in FIG. 1 where no fuel conduit 10 is guide into the locking member 4, each tongue 8 present a bend angle, relative to an axis being perpendicular to the main body 6 of the locking member 4. Preferably is the bend angle between 10° and 50°, more preferably between 20° and 30°.

The tongues 8 are resilient in order for them to bend and put the locking member 4 in an open position for receiving the fuel conduit 10. The tongues 8 can be provided in any number, although eight tongues are shown, by example only, in FIG. 1. Excellent latching capability is provided by an even number of tongues 8 arranged in opposed pairs as shown in FIG. 1. However, it is realized that an odd number of tongues 8 can also be employed. Thus, as the skilled person realizes, the amount of tongues 8 may vary. The amount of tongues 8 is preferably eight or more, this in order for the fuel conduit 10 to be retained in a secure manner. Moreover, the rigidity of the locked position also depends on the amount of tongues 8, more tongues 8 makes the locked position more rigid.

Each tongue 8 may be formed having a curved shape. This makes each tongue 8 easy to bend by the fuel conduit 10. Further, by forming the tongues 8 as having a curved shape the strength of the tongues 8 is enhanced.

The locking member 4 of the fuel dispensing unit 2 according to the present invention is especially well suited for retaining a fuel conduit 10 in a vertical direction, just as showed in FIG. 1.

FIG. 2a illustrates an embodiment of a fuel conduit 10. The fuel conduit 10 may e.g. be made of aluminum, an aluminum alloy, copper, steel or stainless steel. The fuel conduit 10 is provided with a first external annular bead 12 and a second external annular bead 14. The external annular beads 12, 14 are preferably being formed of the actual fuel conduit wall in a bulging lathe. The space between the two external annular beads 12, 14 is adapted to receive an O-ring 16. The external annular beads 12, 14 and the O-ring 16 are located at a joining end of the fuel conduit 10. The O-ring 16 is used for sealing a connection between the fuel conduit 10 and a coupling (not shown) or another fuel conduit (not shown).

The locking member 4 may be designed in various modes. However, an important feature is that the locking member 4 should not harm the external annular beads 12, 14 or the O-ring 16 when the external annular beads 12, 14 and/or the O-ring 16 are putting the locking member 4 in the open position for receiving said fuel conduit 10. Below three different embodiments of a locking member 4 will be presented.

FIGS. 2a-c illustrates a sequential display of how a fuel conduit 10 is retained in a locking member 4 according to a first embodiment.

FIG. 2a illustrates the locking member 4 comprising inwardly extending resilient tongues 8. The locking member 4 may e.g. be made of stainless spring steel, spring steel or plastics. The tongues 8 are integrally formed as a one piece extension from the main body 6 of the locking member 4. Each tongue 8 comprises an obtuse edge 18 and an acute edge 20 at the end portion 22 thereof. The angle of the obtuse edge may e.g. be 90°, 100°, 110° or 120° but it is preferably 130° or greater.

FIG. 2b illustrates a locking member 4 according to the first embodiment wherein a fuel conduit 10 is entered into the locking member 4 in a fuel conduit entering direction E. The external annular beads 12, 14 and the O-ring 16 of the fuel conduit 10 are putting the locking member 4 in an open position for receiving the fuel conduit 10. As seen this is made such that the external annular beads 12, 14 and the O-ring 16 are forcing the tongues 8 to bend outwardly, i.e. the external annular beads 12, 14 and the O-ring 16 are forcing the locking member 4 to assume the open position. It is only the obtuse edge 18 of each tongue 8 that engage the fuel conduit 10 in the open position. This minimizes the risk of the tongues 8 to cause any damage to the external annular beads 12, 14 or the O-ring 16 when the fuel conduit 10 is received by the locking member 4. As mentioned above, the obtuse edge 18 have an angle being greater than 100°, preferably greater than 130°. A greater angle of the obtuse edge 18 makes the obtuse edge 18 blunter. A blunt obtuse edge 18 is less harmful against the external annular beads 12, 14 and the O-ring 16.

FIG. 2c illustrates the locking member 4 according to the first embodiment into which a fuel conduit 10 has been retained. The tongues 8 of the locking member 4 have now obtained a less bent state and the locking member 4 is now in a locked position which securely retains the fuel conduit 10. Thus, the tongues 8 of the locking member 4, more precise the acute edge 20 at the and portion 22 of each tongue 8, prevent the fuel conduit 10 to be withdrawn in a fuel conduit withdrawal direction A.

Figure 3A:
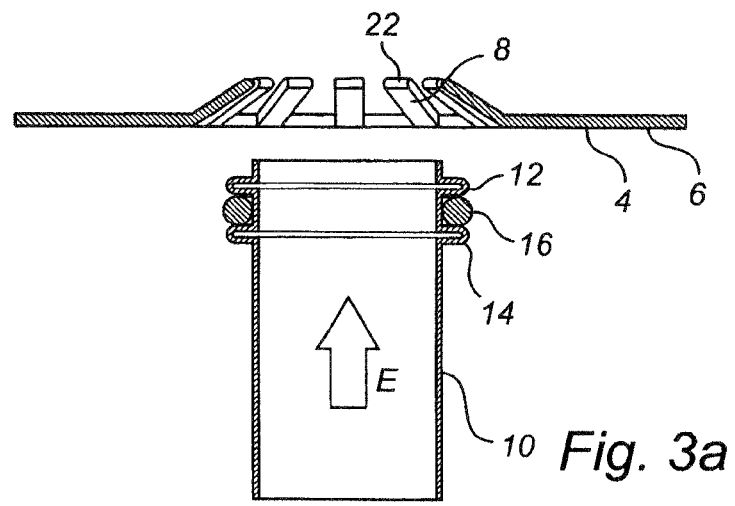
FIG. 3a is a sectional view of a locking member according to a second embodiment of the present invention.
Figure 3B:
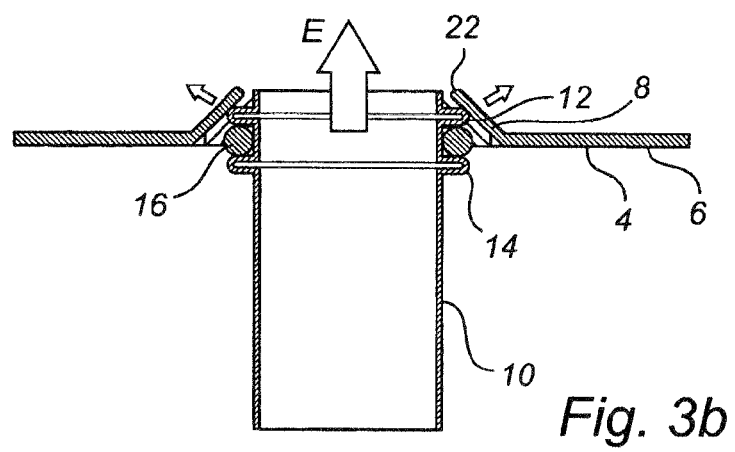
FIG. 3b is a sectional view of a locking member according to the second embodiment wherein the external annular bead and the O-ring of the fuel conduit of FIG. 2 is putting the locking member in an open position for receiving said fuel conduit.
Figure 3C:
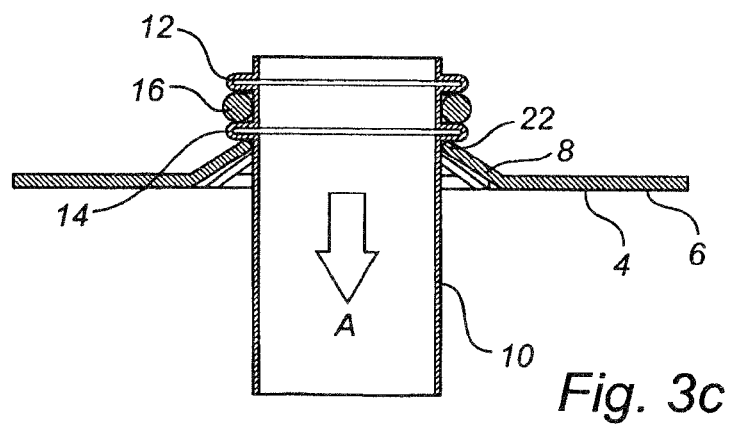
FIG. 3c is a sectional view of a locking member according to the first embodiment into which a fuel conduit has been retained.

FIGS. 3a-c illustrates a sequential display of how a fuel conduit 10 is retained in a locking member 4 according to a second embodiment.

FIG. 3a illustrates the locking member 4 comprising inwardly extending resilient tongues 8. The locking member 4 may e.g. be made of stainless spring steel, spring steel or plastics. The tongues 8 are integrally formed as a one piece extension from the main body 6 of the locking member 4. Each tongue 8 comprises an edgeless end portion 22.

FIG. 3b illustrates a locking member 4 according to the second embodiment wherein a fuel conduit 10 is entered into the locking member 4 in a fuel conduit entering direction E. The external annular beads 12, 14 and the O-ring 16 of the fuel conduit 10 are putting the locking member 4 in an open position for receiving the fuel conduit 10. As seen this is made such that the external annular beads 12, 14 and the O-ring 16 are forcing the tongues 8 to bend outwardly, i.e. the external annular beads 12, 14 and the O-ring 16 are forcing the locking member 4 to assume the open position. Due to the edgeless end portion 22 of the tongues 8 the risk of the tongues 8 to cause any damage to the external annular beads 12, 14 or the O-ring 16 when the fuel conduit 10 is received by the locking member is minimized.

FIG. 3c illustrates the locking member 4 according to the second embodiment into which a fuel conduit 10 has been retained. The tongues 8 of the locking member 4 have now obtained a less bent state and the locking member 4 is now in a locked position which securely retains the fuel conduit 10 Thus, the tongues 8 of the locking member prevent the fuel conduit 10 to be withdrawn in the fuel conduit withdrawal direction A.

Figure 4A:
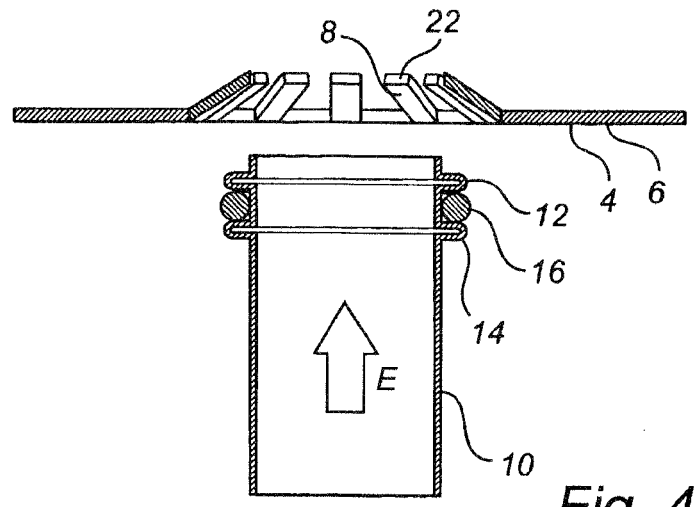
FIG. 4a is a sectional view of a locking member according to a third embodiment of the present invention.
Figure 4B:
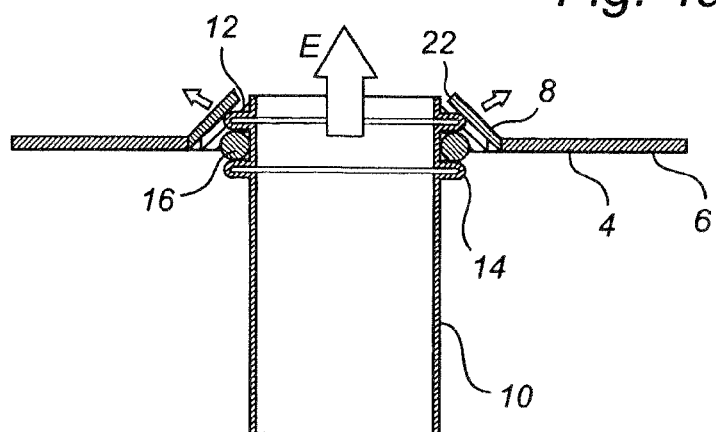
FIG. 4b is a sectional view of a locking member according to the third embodiment wherein the external annular bead and the O-ring of the fuel conduit of FIG. 2 is putting the locking member in an open position for receiving said fuel conduit.
Figure 4C:
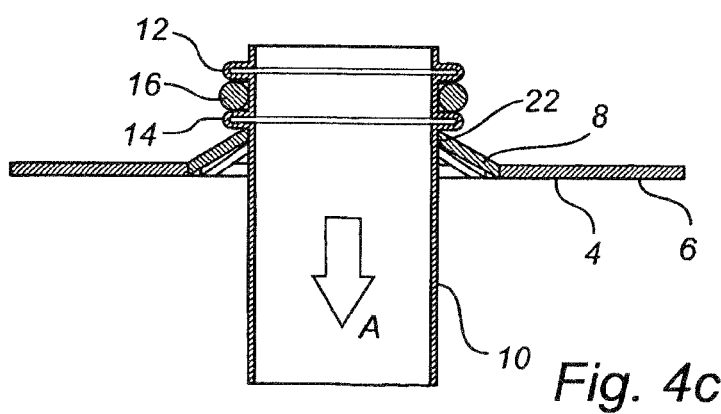
FIG. 4c is a sectional view of a locking member according to the third embodiment into which a fuel conduit has been retained.

FIGS. 4a-c illustrates a sequential display of how a fuel conduit 10 is retained in a locking member 4 according to a third embodiment.

FIG. 4a illustrates the locking member 4 comprising inwardly extending resilient tongues 8. In the embodiment showed, the main body 6 of the locking member 4 is made of one type of material, e.g. stainless spring steel, spring steel or plastics and the tongues 8 are formed by another type of material having a degree of hardness being less than the degree of hardness of the external annular beads 12, 14 and the O-ring 16 of the fuel conduit 10 A typical O-ring is made of a rubber material having a degree of hardness being in the range 70-80 shore A. By forming the tongues 8 by a type of material having a degree of hardness being less than the degree of hardness of the external annular beads 12, 14 and the O-ring 16 the risk of the tongues 8 to cause any damage to the external annular beads 12, 14 or the O-ring 16 when the fuel conduit 10 is received by the locking member 4 is minimized. In the above described embodiment the main body 6 of the locking member 4 and the tongues 8 of the locking member 4 are made by different materials. However, as is readily appreciated by a person skilled in the art the main body 6 of the locking member 4 and the tongues 8 of the locking member 4 can be formed in various manners. The important feature according to this third embodiment of the locking member 4 is that at least the end portion 22 of each tongue 8 is formed by a material having a degree of hardness being less than the degree of hardness of the external annular beads 12, 14 and the O-ring 16. For example may the entire locking member 4 be formed by a material having a degree of hardness being less than the degree of hardness of the external annular beads 12, 14 and the O-ring 16 or according to another example both the main body 6 and the tongues 8 of the locking member 4 may be formed by stainless spring steel, spring steel or plastics except the end portion 22 of each tongue 8 which is formed by a material having a degree of hardness being less than the degree of hardness of the external annular beads 12, 14 and the O-ring 16.

FIG. 4b illustrates a locking member 4 according to the third embodiment wherein a fuel conduit 10 is entered into the locking member 4 in a fuel conduit entering direction E. The external annular beads 12, 14 and the O-ring 16 of the fuel conduit 10 are putting the locking member 4 in an open position for receiving the fuel conduit 10. As seen in FIG. 4b, this is made such that the external annular beads 12, 14 and the O-ring 16 are forcing the tongues to bend outwardly, i.e. the external annular beads 12, 14 and the O-ring 16 are forcing the locking member 4 to assume the open position. Due to that the material of the end portion 22 of each tongue 8 is formed by a material having a degree of hardness being less than the degree of hardness of the external annular beads 12, 14 and the O-ring 16 the risk of the tongues 8 to cause any damage to the external annular beads 12, 14 or the O-ring 16 when the fuel conduit 10 is received by the locking member 4 is minimized.

FIG. 4c illustrates the locking member 4 according to the third embodiment into which a fuel conduit 10 has been retained. The tongues 8 of the locking member 4 have now obtained a less bent state and the locking member 4 is now in a locked position that securely retains the fuel conduit 10. Thus, the tongues 8 of the locking member 4 prevent the fuel conduit 10 to be withdrawn in a fuel conduit withdrawal direction A.

Figure 6:
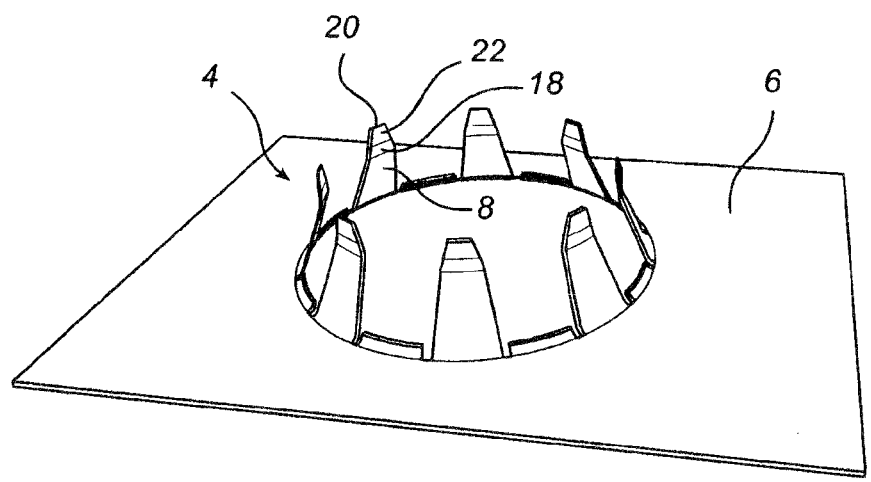
FIG. 6 is a perspective view of a locking member according to a forth embodiment of the present invention.

Another embodiment of a locking member 4 is illustrated in FIGS. 6 and 7. According to this embodiment the obtuse edge 18 is formed by angling the end portion 22 of each tongue 8.

Above four different embodiments of a locking member 4 to be comprised in the fuel dispensing unit 2 of the present invention has been presented. However, as is readily appreciated by a person skilled in the art, other embodiments than the ones disclosed above are equally possible within the scope of the invention. Especially, may some of the tongues 8 of the locking member 4 be made according to one of the above described embodiments and some of the tongues 8 of the locking member be made according to another of the above described embodiments. The important feature is that tongues 8 are formed in a manner so that the risk of the tongues 8 to cause any damage to the external annular beads 12, 14 or the O-ring 16 when the fuel conduit 10 is received by the locking member 4 is minimized.

Figure 5A:
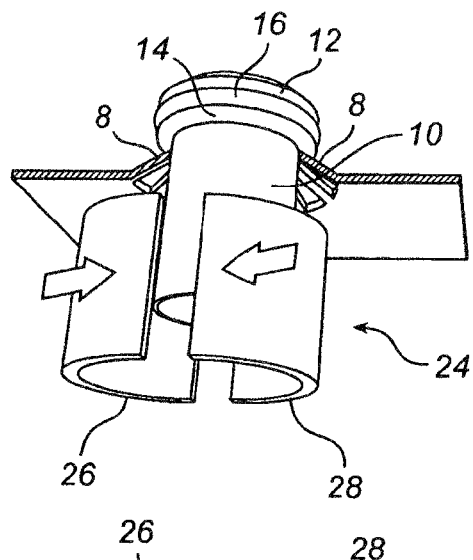
FIG. 5a is a perspective view of a removing member being arranged around the fuel conduit.
Figure 5B:
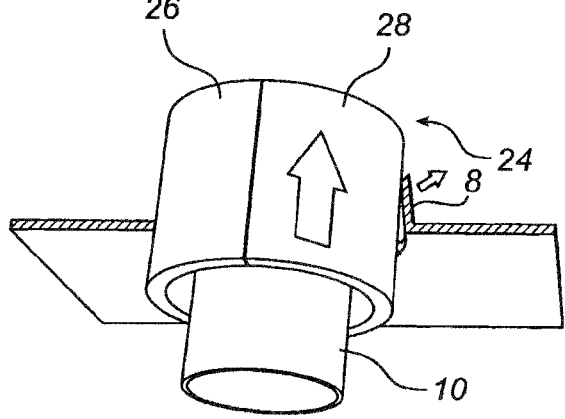
FIG. 5b is a perspective view of the removing member being guided towards the tongues of the locking member in order to set the locking member in an open position.
Figure 5C:
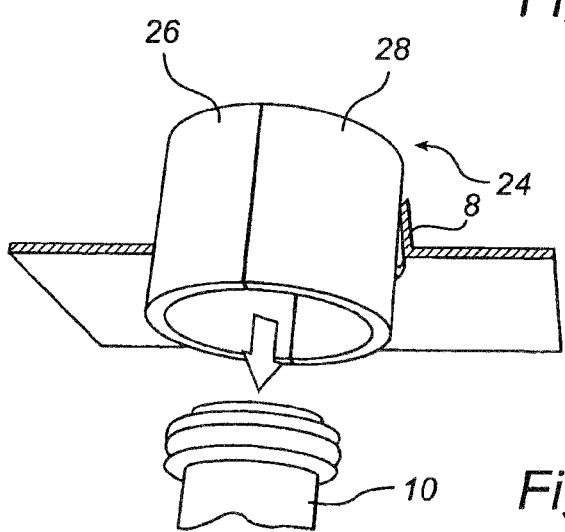
FIG. 5c is a perspective view of the fuel conduit being removed from the locking member while the removing member is setting the locking member in an open position.

Sometime it is necessary to service the fuel dispensing unit 2, e.g. exchange of an old fuel conduit 10. As described above, the fuel conduit 10 is securely retained by the locking member 4, thus, the tongues 8 of the locking member 4 prevent the fuel conduit 10 to be withdrawn in the fuel conduit withdrawal direction A. With reference to FIGS. 5*a-c* a method of removing a fuel conduit 10 retained by a locking member 4 of a fuel dispensing unit 2 according to the present invention will be described.

As a first step in the method for removing a fuel conduit 10 from the locking member 4 a removing member 24 in the form of a pipe being split in a first and a second part 26, 28 is arranged around the fuel conduit 10 below the locking member 4, see FIG. 5*a*. By using a removing member 24 split in two parts 26, 28 it is easy to arrange the removing member 24 around the fuel conduit 10. Next the removing member 24 is guided towards the tongues 8 of the locking member 4 in order to set the locking member 4 in the open position, see FIG. 5*b*. Now the fuel conduit 10 may be withdrawn in the fuel conduit withdrawal direction A inside the removing member 24. This due to that the removing member 24 is arranged such that the fuel conduit 10 may be freely moved inside the removing member 24. In FIG. 5*c* the fuel conduit 10 has been removed from the locking member 4 while the removing member 24 is setting the locking member in the open position.

In the case of the locking member being the forth embodiment, as shown in FIGS. 5 and 6, each tongue has an upper angled part. If being so the external annular bead 14 being closest to the locking member 4 is affecting each tongue 8 to bend outwards and thus preventing the O-ring 16 and the other external annular bead 12 to catch on to the end portions 22 of the tongues 8.

Moreover, the same features that minimizes the risk of the tongues 8 to cause any damage to the external annular beads 12, 14 or the O-ring 16 when the fuel conduit 10 is received by the locking member 4, i.e. that the obtuse edge 18 at the end portion 22 of each tongue 8, that each tongue 8 comprises an edgeless end portion 22 or that the end portion 22 of each tongue 8 is formed by a material having a degree of hardness being less than the degree of hardness of the external annular beads 12, 14 and the O-ring 16, permits that the removing member 24 may be withdrawn from the locking member 4. Moreover, at least the radial outer most part of the removing member may be formed by a material having low friction against the tongues, i.e. brass, steel or stainless steel.

It is contemplated that there are numerous modifications of the embodiments described herein, which are still within the scope of the invention as defined by the appended claims.

The invention claimed is:

1. A fuel dispensing unit comprising:
    a fuel conduit comprising an external annular bead; and
    a locking member circumferentially disposed about the fuel conduit and having resilient tongues, each tongue comprising a top surface, a bottom surface, and an end surface extending therebetween, wherein the top surface and the end surface define an acute edge therebetween, and the bottom surface and the end surface define an obtuse edge therebetween, the locking member being movable between an open position, in which the external annular bead of the fuel conduit causes the tongues to deflect radially outward away from the fuel conduit such that only the obtuse edge of each tongue engages the fuel conduit to allow slideable movement of the fuel conduit relative to the locking member, and a locked position, in which only the acute edge of each tongue engages the fuel conduit to prevent slidable movement of the fuel conduit relative to the locking member.

2. The fuel dispensing unit according to claim 1, wherein the obtuse angle is greater than 100°.

3. The fuel dispensing unit according to claim 1, wherein the obtuse angle is greater than 130°.

4. The fuel dispensing unit according to claim 1, wherein the locking member has a main body with an opening surrounded by the resilient tongues, and wherein the resilient tongues are monolithic with the main body.

5. A fuel dispensing unit comprising:
    a fuel conduit comprising an external annular bead; and
    a locking member comprising inwardly extending resilient tongues integrally formed with the locking member and disposed radially around an opening receiving the fuel conduit, each resilient tongue having an obtuse edge and an acute edge, the tongues being configured to deflect radially outward to an open position when the fuel conduit is passed therethrough, only the obtuse edge of each tongue engaging the fuel conduit in the open position, and the tongues being movable to a closed position in which the acute edge of each tongue engages the annular bead to lock the fuel conduit within the opening.

6. The fuel dispensing unit of claim 5, wherein the fuel conduit further comprises a second external annular bead, wherein an O-ring is disposed between the two external annular beads, and wherein the two external annular beads and the O-ring are arranged to put the locking member in the open position when receiving said fuel conduit.

7. The fuel dispensing unit according to claim 5, wherein the locking member has a main body with an opening surrounded by the resilient tongues, and wherein the resilient tongues are monolithic with the main body.

8. A fuel dispensing unit comprising:
    a fuel conduit comprising an external annular bead; and
    a locking member comprising a main body having an opening surrounded by inwardly extending resilient tongues that are monolithic with the main body, the resilient tongues being moveable between an open position in which the fuel conduit is slidably movable through the opening in the main body, and a locked position in which the tongues prevent slidable movement of the fuel conduit relative to the main body, wherein the external annular bead of the fuel conduit is configured to cause the resilient tongues to move to the open position when the opening in the locking member receives the fuel conduit, wherein an end portion of each resilient tongue is configured to engage the external annular bead when the locking member is in the locked position, and wherein the tongues are formed from a first material having a degree of hardness that is less than a degree of hardness of a material forming the external annular bead.

9. The fuel dispensing unit according to claim 8, wherein the fuel conduit further comprises an external O-ring, wherein the external annular bead and the O-ring are configured to cause the locking member to move to the open position when the locking member receives the fuel conduit, and wherein the end portion of each tongue is formed by a material having a degree of hardness being less than a degree of hardness of a material forming the O-ring.

10. The fuel dispensing unit according to claim 9, wherein the fuel conduit further comprises a second external annular bead, wherein the O-ring is accommodated between the two external annular beads, and wherein the two external annular beads and the O-ring are configured to cause the locking member to move to the open position when the locking member receives the fuel conduit.

* * * * *